United States Patent
Maheshwari et al.

(10) Patent No.: US 8,503,424 B2
(45) Date of Patent: Aug. 6, 2013

(54) APPARATUS AND METHODS FOR MANAGING OPERATOR INFORMATION

(75) Inventors: Shailesh Maheshwari, San Diego, CA (US); Kushang Desai, San Diego, CA (US); Manisha Somani, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 371 days.

(21) Appl. No.: 12/822,020

(22) Filed: Jun. 23, 2010

(65) Prior Publication Data

US 2011/0317592 A1   Dec. 29, 2011

(51) Int. Cl.
*H04J 3/24* (2006.01)

(52) U.S. Cl.
USPC .......................................... 370/349; 370/353

(58) Field of Classification Search
USPC .............. 370/313, 310.2, 328, 338, 349, 354, 370/353, 352
See application file for complete search history.

(56) References Cited

U.S. PATENT DOCUMENTS

| | | | | |
|---|---|---|---|---|
| 5,351,289 | A * | 9/1994 | Logsdon et al. | 379/142.04 |
| 6,208,719 | B1 | 3/2001 | Lo et al. | |
| 6,259,780 | B1 | 7/2001 | Sherwood et al. | |
| 6,941,134 | B2 | 9/2005 | White | |
| 7,502,450 | B2 * | 3/2009 | Sakai et al. | 379/93.35 |
| 7,668,507 | B2 * | 2/2010 | Ramsten et al. | 455/41.1 |
| 8,019,330 | B2 * | 9/2011 | Phillips et al. | 455/422.1 |
| 2003/0054864 | A1 * | 3/2003 | Mergler | 455/566 |
| 2004/0052341 | A1 | 3/2004 | Yeh et al. | |
| 2004/0203744 | A1 | 10/2004 | Hicks et al. | |
| 2007/0015507 | A1 | 1/2007 | Petronelli | |
| 2007/0111714 | A1 * | 5/2007 | Edwards | 455/415 |
| 2007/0135128 | A1 * | 6/2007 | Villa et al. | 455/445 |
| 2008/0059642 | A1 | 3/2008 | Bhogal et al. | |
| 2008/0182552 | A1 | 7/2008 | Dinh et al. | |
| 2009/0215486 | A1 | 8/2009 | Batni et al. | |
| 2009/0318120 | A1 | 12/2009 | Okuyama | |
| 2010/0130185 | A1 | 5/2010 | Desai et al. | |

FOREIGN PATENT DOCUMENTS

| | | |
|---|---|---|
| CN | 1537381 A | 10/2004 |
| JP | 2004072165 A | 3/2004 |
| JP | 2005012432 A | 1/2005 |
| JP | 2006121512 A | 5/2006 |
| KR | 20070025816 | 3/2007 |
| WO | WO2008026049 A2 | 3/2008 |
| WO | WO2010062980 A2 | 6/2010 |

OTHER PUBLICATIONS

International Search Report and Written Opinion—PCT/US2001/040526—ISA/EPO—Oct. 5, 2011.

* cited by examiner

*Primary Examiner* — Brenda H Pham
(74) *Attorney, Agent, or Firm* — Fariba Yadegar-Bandari

(57) ABSTRACT

Apparatus and methods for managing operation information include determining a home network for a wireless device and receiving a call with a number identifying a calling party and a network identification identifying the network for the calling party. The apparatus and methods also include determining whether the received network identification corresponds to the home network for the wireless device. In addition, the apparatus and methods include displaying a notification based upon the determination; and accepting and/or rejecting the call based upon the notification.

70 Claims, 10 Drawing Sheets

APPARATUS AND METHODS FOR MANAGING OPERATOR INFORMATION

REFERENCE TO CO-PENDING APPLICATIONS FOR PATENT

The present application for patent is related to the following co-pending U.S. patent applications:

"Ser. No. 12/324,660" entitled "Disclosure of Communication Information", filed Nov. 26, 2008, assigned to the assignee hereof, and expressly incorporated by reference herein.

BACKGROUND

1. Field

The following description relates generally to wireless communications and, more particularly, to managing operator information for wireless communications in conjunction with a mobile device.

2. Background

Wireless communication systems are widely deployed to provide various types of communication content, including voice and data, for example. Wireless devices, such as a cellular telephone or a handheld device having wireless connection capability are deployed within the wireless communication system for communicating with each other. In addition, wireless communication systems may be multiple-access systems capable of supporting communication with multiple users by sharing available system resources, e.g., bandwidth, or transmission power, among others. In a typical case, a user may purchase a wireless device and a communication plan, e.g., a number of minutes each month that the user may use for a certain amount of money, from a network provider thus, allowing the user to communicate with other entities in the wireless communication system. The network providers may provide various incentives for a user to place and/or receive calls within the network provider's communication system. For example, if the call is within the network provider's communication system, the user may not be charged for the call, e.g., the minutes used for calls within the network provider's communication system that are not charged against the amount of minutes a user can use. Thus, it would be advantageous for a user to be able to identify which network a communication device within the wireless communication system belonged to.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method for receiving a call. The method may include determining, at a wireless device, a home network for the wireless device. The method may also include receiving the call, wherein the call comprises an identifier. In addition, the method may include determining whether the identifier corresponds to the home network. Further, the method may include displaying a notification on the mobile device based upon the determination.

Another aspect relates to at least one processor configured to receiving a call. The processor may include a first module for determining, at a wireless device, a home network for the wireless device. The processor may also include a second module for receiving the call, wherein the call comprises an identifier. Moreover, the processor may include a third module for determining whether the identifier corresponds to the home network. The processor may further include a fourth module for displaying a notification on the mobile device based upon the determination.

Yet another aspect relates to a computer program product. The computer program product may include a computer-readable medium including at least a first set of codes for causing a computer to determine, at a wireless device, a home network for the wireless device. The computer-readable medium may also include at least a second set of codes for causing the computer to receive the call, wherein the call comprises an identifier. Additionally, the computer-readable medium may include at least a third set of codes for causing the computer to determine whether the identifier corresponds to the home network. Further, the computer-readable medium may include at least a fourth set of codes for causing the computer to display a notification on the mobile device based upon the determination.

Another aspect relates to an apparatus for receiving a call. The apparatus may include means for determining, at a wireless device, a home network for the wireless device. In addition, the apparatus may include means for receiving the call, wherein the call comprises an identifier. Moreover, the apparatus may include means for determining whether the identifier corresponds to the home network. Furthermore, the apparatus may include means for displaying a notification on the mobile device based upon the determination.

Still another aspect relates to an apparatus for receiving a call. The apparatus may include a network determiner component operable for determining, at a wireless device, a home network for the wireless device. The apparatus may also include a communications component operable for receiving the call, wherein the call comprises an identifier. The apparatus may further include the network determiner component operable for determining whether the identifier corresponds to the home network. Additionally, the apparatus may also include a presentor component operable for displaying a notification on the mobile device based upon the determination.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects relate to methods and apparatus for managing operator information for wireless communications and providing flexibility in determining whether to place and/or receive a communication based upon the operator information. The methods and apparatus may include storing operator information and using the stored operator information in determining whether to place and/or receive a communication.

Figure 1:
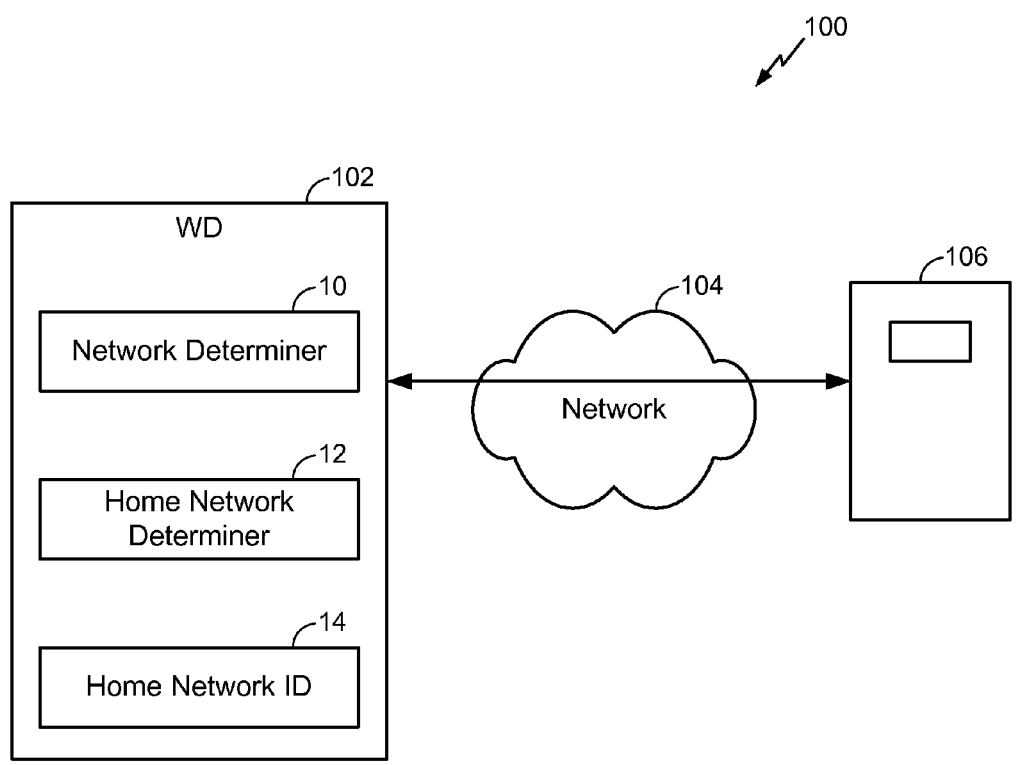
FIG. 1 is an illustration of a connectivity system in accordance with an aspect.

Turning now to FIG. 1, illustrated is an example connectivity system 100 that includes one or more wireless devices 102 communicating through one or more access networks 104 with one or more communication devices 106. Wireless device 102 may include any mobile or portable computing or communications device, such as a cellular device, that may connect to an access network 104. Wireless device 102 may be, for example, a cellular telephone, a navigation system, a computing device, a camera, a PDA, a music device, or a handheld device having wireless connection capability, among other devices. In addition, communication device 106 may be, for example, a cellular telephone, a landline telephone, a navigation system, a computing device, a camera, a PDA, a music device, or a handheld device having wireless connection capability, among other devices. Furthermore, access network 104 may provide one or more types of communication connections to wireless device 102 and communication device 106.

Wireless device 102 may place and/or receive a communication, e.g., a telephone call, a video conferencing call, a voice over internet protocol (IP) call, a short message service (SMS) message, a multimedia messaging service (MMS) message, a video, forwarding a voice message, or a data transfer, among other communications, via access network 104 to one or more communication devices 106. In addition, wireless device 102 may receive a communication via access network 104 from one or more communication devices 106.

In an aspect, wireless device 102 may include a home network determiner 12 component operable for determining a home communication network of wireless device 102. A home communication network, may include, but is not limited to, a network of an operator that wireless device 102 is registered with and/or a network where wireless device 102 receives preferred rates for communications placed within the network. Preferred rates may include, for example, reduced rates for the communications, allowing the wireless device to communicate free of charge, or any combination thereof. In an aspect, wireless device 102 may include a subscriber identity module (SIM) card with an international mobile subscriber identity (IMSI) for identifying the home network of the wireless device. For example, the IMSI may include a mobile country code (MCC) and/or a mobile network code (MNC) which identify the home network for the wireless device. In another aspect, wireless device 102 may include an equivalent public land mobile network (EPLM) for identifying the home network and/or other preferred networks for the wireless device. It should be appreciated that home network determiner 12 may use the IMSI and/or the EPLM for determining the home communication network for wireless device 102.

Wireless device 102 may also include a home network identification (ID) 14 for identifying the home network of the wireless device 102, e.g., the network determined by the home network determiner 12. In addition, wireless device 102 may further include a network determiner 10 component operable for determining one or more communication networks for the one or more communication devices 106 and comparing the communication networks with the home network ID 14 for wireless device 102.

When wireless device 102 communicates with the one or more communication devices 106 over communication network 104, the network determiner 10 may determine whether the communication network 104 matches the home network ID 14 for the wireless device 102. If the communication network 104 does not match the home network ID 14, then a user of wireless device 102 may be prompted to decide whether to accept the call from communication device 106 and/or whether to place a call to communication device 106. For example, the user may be charged additional minutes and/or money for communicating over communication networks that are different from the home network. Thus, the user of wireless device 102 may restrict and/or allow communications with one or more communication devices 106 based upon whether the communication network 104 matches the home network ID 14 for the wireless device 102.

Figure 2:
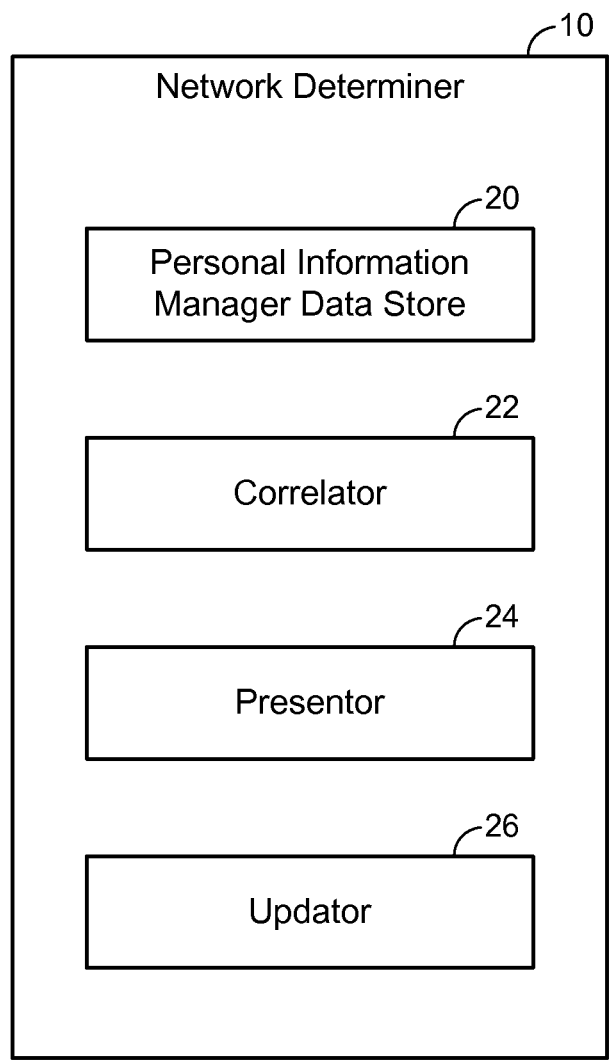
FIG. 2 is an illustration of an example network determiner component operable within a mobile device in accordance with an aspect.

Referring now to FIG. 2, illustrated is an example network determiner 10 component operable within wireless device 102 in accordance with an aspect. In an aspect, when a call is placed and/or received by a user of wireless device 102 (FIG. 1), network determiner 10 may be used for determining whether the call is associated with a contact stored within wireless device 102. In addition, network determiner 10 may be used for determining whether the call is within the same home network as wireless device 102. In an aspect, network determiner 10 may include a personal information manager (PIM) data store 20 operable for storing a set of contact information, e.g., contact names, contact numbers, contact addresses, a contact number network ID, or a contact group ID, for wireless device 102, as illustrated in FIG. 3.

Figure 3:
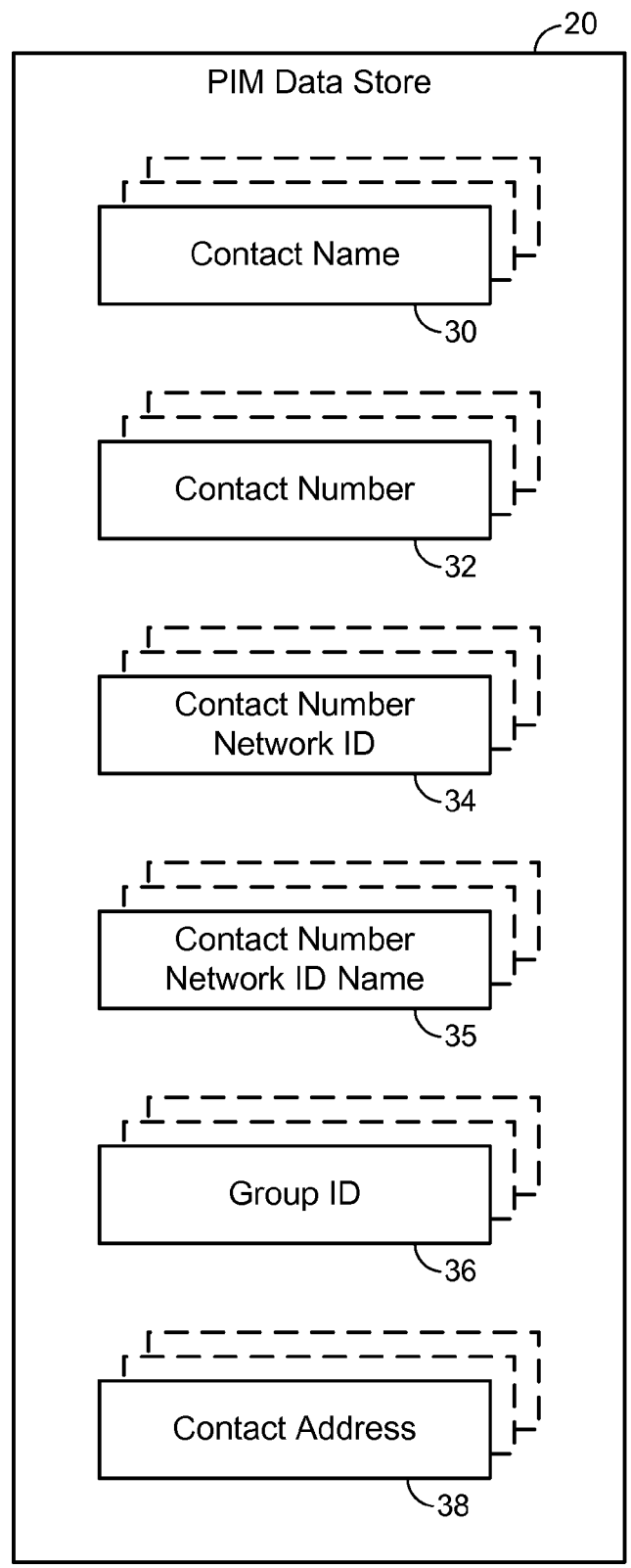
FIG. 3 is an illustration of an example of a personal information manager data store component operable within a mobile device in accordance with yet another aspect.

Turning now to FIG. 3, illustrated is an example PIM data store 20 operable within wireless device 102 in accordance with an aspect. PIM data store 20 may include one or more contact names 30 and/or contact addresses 38 for individuals and/or businesses listed in the PIM data store 20. In addition, PIM data store 20 may include one or more contact numbers 32 associated with the one or more contact names 30 and/or contact addresses 38. PIM data store 20 may also include a contact number network identification (ID) 34 associated with a contact number 32 indicating the network of the contact number 32. Optionally, in one aspect, PIM data store 20 may also include one or more contact number network ID names 35, e.g., an alias for a network, associated with the contact number network ID 34. A contact number network ID name 35 may include, but is not limited to, one of the following names: my network; same network; home network; or different network, among other names. It should be appreciated that the user may enter in the contact number network ID names 35, or that the contact number network ID names 35 may automatically be entered in based upon the received call information.

Moreover, it should be appreciated that a contact name 30 may have one or more contact numbers 32 associated with the contact name 30. Therefore, a contact name 30 may have one or more contact numbers 32 associated with one or more contact number network IDs 34. Additionally, PIM data store 20 may also include a group identification (ID) 36 for identifying whether the contact name 30 is associated with a group, e.g., a group of contact such as, for example, friends, family, co-workers, a chat group, or a professional organization, among others. A group may also include contacts associated with a particular network, e.g., home network, different network, or unknown network. Thus, a group may be created based upon the network information associated with various contacts.

Turning back to FIG. 2, network determiner 10 may further include a correlator 22 component operable for correlating call information, e.g., information associated with an incoming call and/or outgoing call, with the contact information stored within PIM data store 20. For example, correlator 22 may be used for correlating an incoming number with a contact name 30 and/or contact number 32 (FIG. 3) stored within PIM data store 20. In addition, correlator 22 may be used for correlating a communication network for an incoming and/or outgoing call with a contact number network ID 34 and/or a contact number network ID name 35 (FIG. 3) stored within PIM data store 20. Thus, when a user of wireless device makes and/or receives a call, correlator 22 may be used by network determiner 10 for determining whether the incoming and/or outgoing call correlates to a contact name and/or number stored in PIM data store 20 and whether the network information is known for the contact name and/or number.

Network determiner 10 may in addition include a presentor 24 component operable for presenting the network information for the calling party and/or called party. Presentor 24 may display a notification on wireless device 102 for identifying whether the network for the calling party and/or called party is the same as the home network ID 14 for wireless device 102.

In one aspect, the notification may include displaying the contact number network ID name 35 (FIG. 3), e.g., the same network, my network, home network, or a different network. The notification may also include displaying the contact information based upon a group identification, e.g., network association, friends, family, or co-workers. In addition and/or alternatively, the notification may be a visual effect displayed on the wireless device and/or an audio effect emitted from the wireless device. A visual effect may include, but is not limited to, one or more of the following: displaying a number identifying the calling party in a color indicating the communication network, e.g., green from the same network, red for a different network, or grey for an unknown network; displaying an icon indicating the communication network, e.g., a check mark for the same network, a "X" for a different communication network, or a question mark for an unknown communication network; displaying a picture associated with the various network options, contact names, and/or contact numbers; displaying different fonts to indicate whether the communication network is the same, different or unknown; or any combination thereof. In addition, the notification may include an audio effect, such as a voice message indicating whether the network is the same as the home network and/or a ringtone indicating whether the network is the same as the home network, among other audio effects. However, it should be appreciated that these are merely illustrative examples for notifications displayed on the wireless device by presentor 24, and that presentor 24 may use any visual effect and/or audio effect to notify the user of the calling party and/or called party network association. The user of wireless device 102 (FIG. 1) may configure and/or change the notifications for presenting the network information based upon the user's preferences.

In addition, network determiner 10 may also include an updator 26 component operable for updating and/or adding information to the PIM data store 20 and/or wireless device 102. An example updator 26 component according to an aspect is illustrated in FIG. 4.

Figure 4:
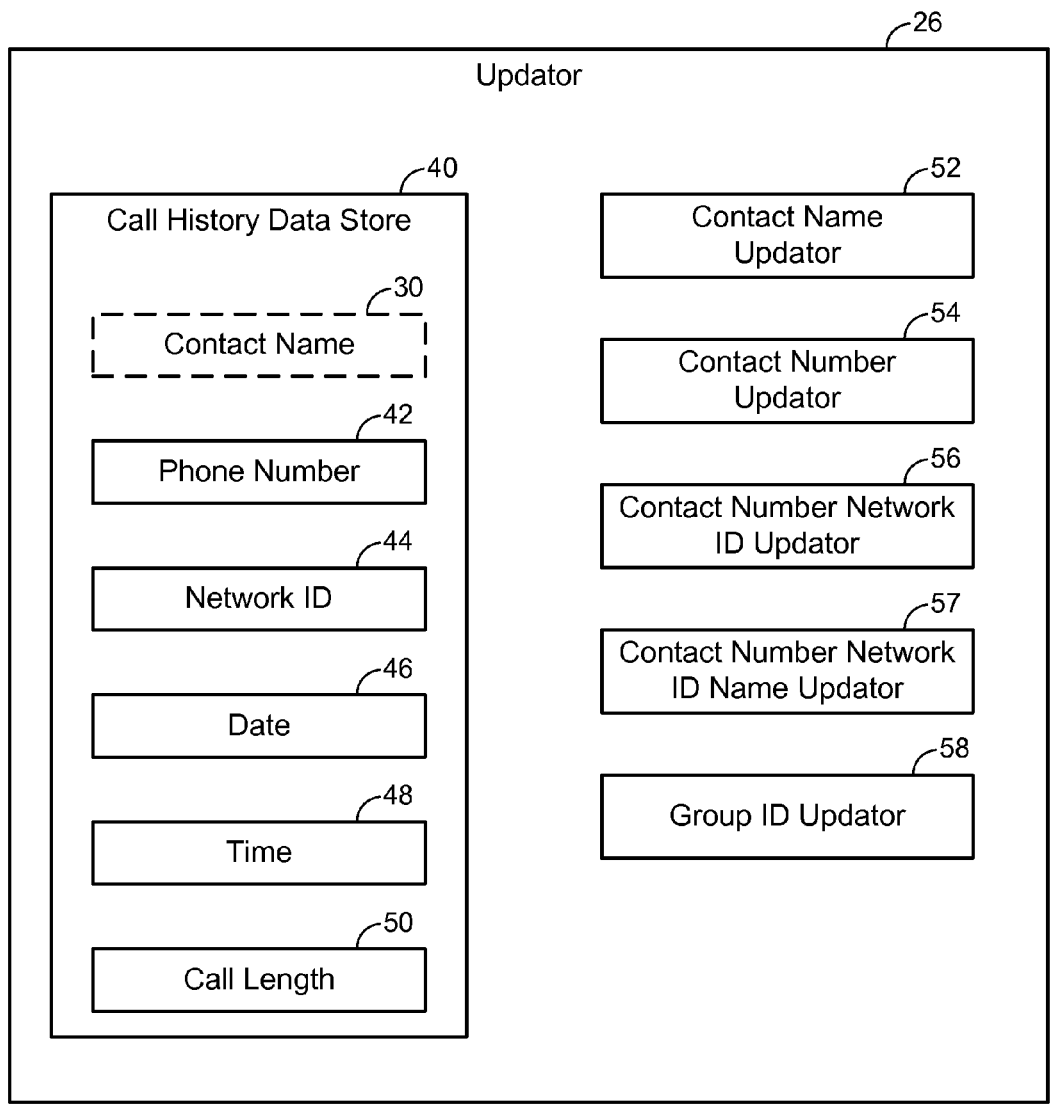
FIG. 4 is an illustration of an example of an updator component operable within a mobile device in accordance with an aspect.

Referring now to FIG. 4, updator 26 may include a call history data store 40 operable for storing incoming and/or outgoing calls from wireless device 102. Thus, as a user makes and/or receives a call to and/or from communication device 106 (FIG. 1), updator 26 may add the call to the call history data store 40. Call history data store 40 may include at least one or more of the following for the call: a phone number 42; a network identification (ID) 44; the date when the call was placed 46; the time when the call was placed 48; and the length of the call 50. Therefore, when a user makes and/or receives a call, updator 26 may update the call history data store 40 with the appropriate call information, e.g., the phone number, network ID, date and/or the time the call was placed and the length of the call. It should be appreciated that if the phone number 42 corresponds to a contact number 32, then the contact name 30 associated with the phone number 42 may be stored in the call history data store 40 as well.

In addition, updator 26 may also include a contact name updator 52 component operable for adding and/or updating one or more contact names 30 in PIM data store 20. Updator 26 may further include a contact number updator 54 component operable for adding and/or updating one or more contact numbers 32 (FIG. 3) in PIM data store 20. For example, if a user wants to add or modify a contact's information, e.g., name or phone number, then contact name updator 52 and contact number updator 54 may be used for updating the PIM data store 20.

Updator 26 may further include a contact number network ID updator 56 and a contact number network ID name updator 57 operable for adding and/or updating contact number network ID and the contact number network ID name, respectively. Moreover, updator 26 may also include group identification (ID) updator 58 component operable for adding and/or updating a contact's group ID. As a contact is placed into a group and/or updated by a user, the group ID updator 58 may be used to update the group associations for the contact in PIM data store 20, e.g., family, friends, co-workers, a chat group, a professional organization, or network association, among others.

Therefore, when a user places and/or receives a call to a communication device 106, network determiner 10 may assist a user in determining if the call is associated with a contact stored within the PIM data store 20 and the network associated with the communication device 106.

Figure 5:
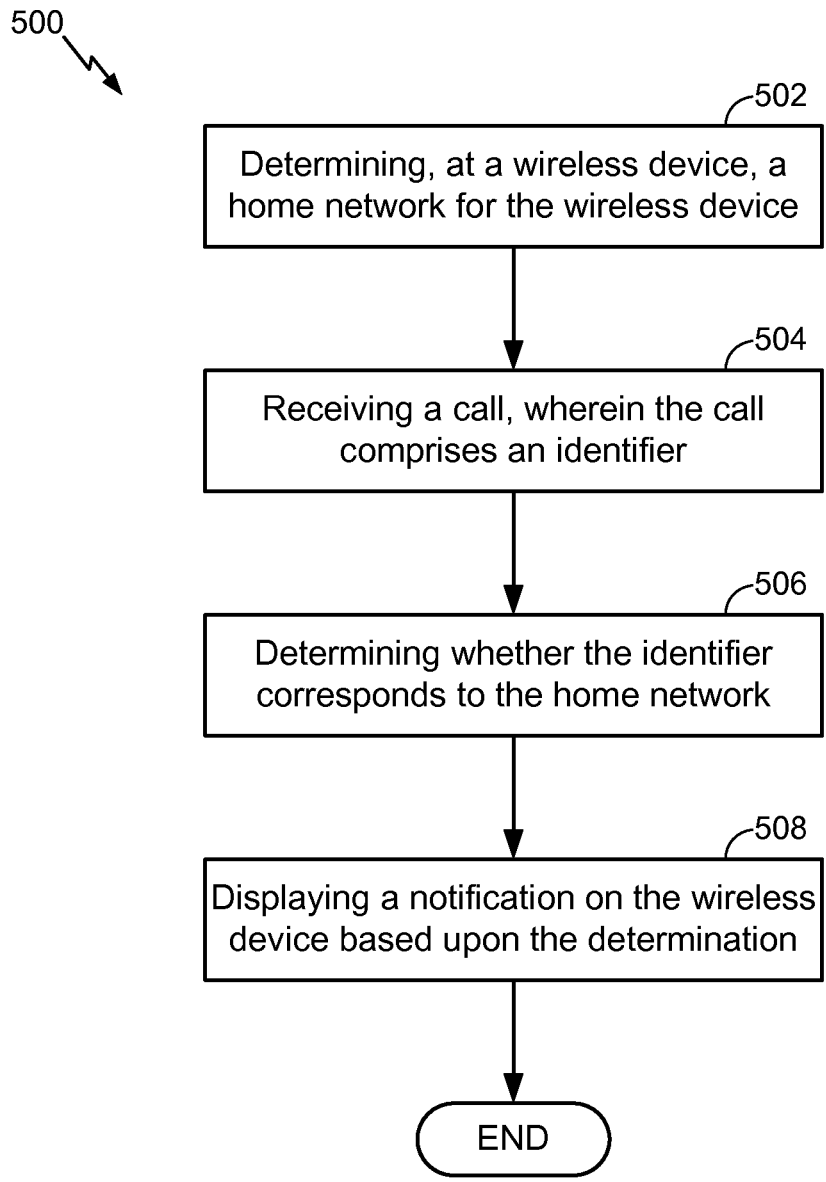
FIG. 5 is a flow chart illustrating a method for receiving a call in accordance with another aspect.

Turning now to the flow diagram 500 in FIG. 5, an aspect of a method for receiving a call includes, at 502, determining a home network for the wireless device. For example, the home network determiner (FIG. 1) may determine the home network for the wireless device. As discussed below in regards to FIG. 6, the home network may include a communication network where the wireless device is registered. It should be appreciated that the call received may include, but is not limited to, an outgoing call to a called party and/or an incoming call from a calling party. In addition, the call may include, for example, a telephone call, a video conferencing call, a voice over internet protocol (IP) call, a SMS message, a MMS message, a video, forwarding a voice message, or a data transfer, among other calls. At 504, the method further includes receiving the call, wherein the call comprises an identifier. The identifier may include, for example, a network identification for identifying the network that the communication device is communicating over, e.g., a calling party's communication network and/or a called party's communication network. In addition, the identifier may include, for example, a number identifying a party associated with the call, e.g., a called party and/or a calling party, among other identifiers.

Next, at 506, the method includes determining whether the identifier corresponds to the home network, e.g., if the network the communication device is communicating over is the same network as, or a different network from, the home network for the wireless device. At 508, the method includes displaying a notification on the mobile device based upon the determination. The notification may indicate whether the networks are the same, the networks are different, or that the communication network is unknown, as discussed in more detail below in FIG. 6.

Figure 6:
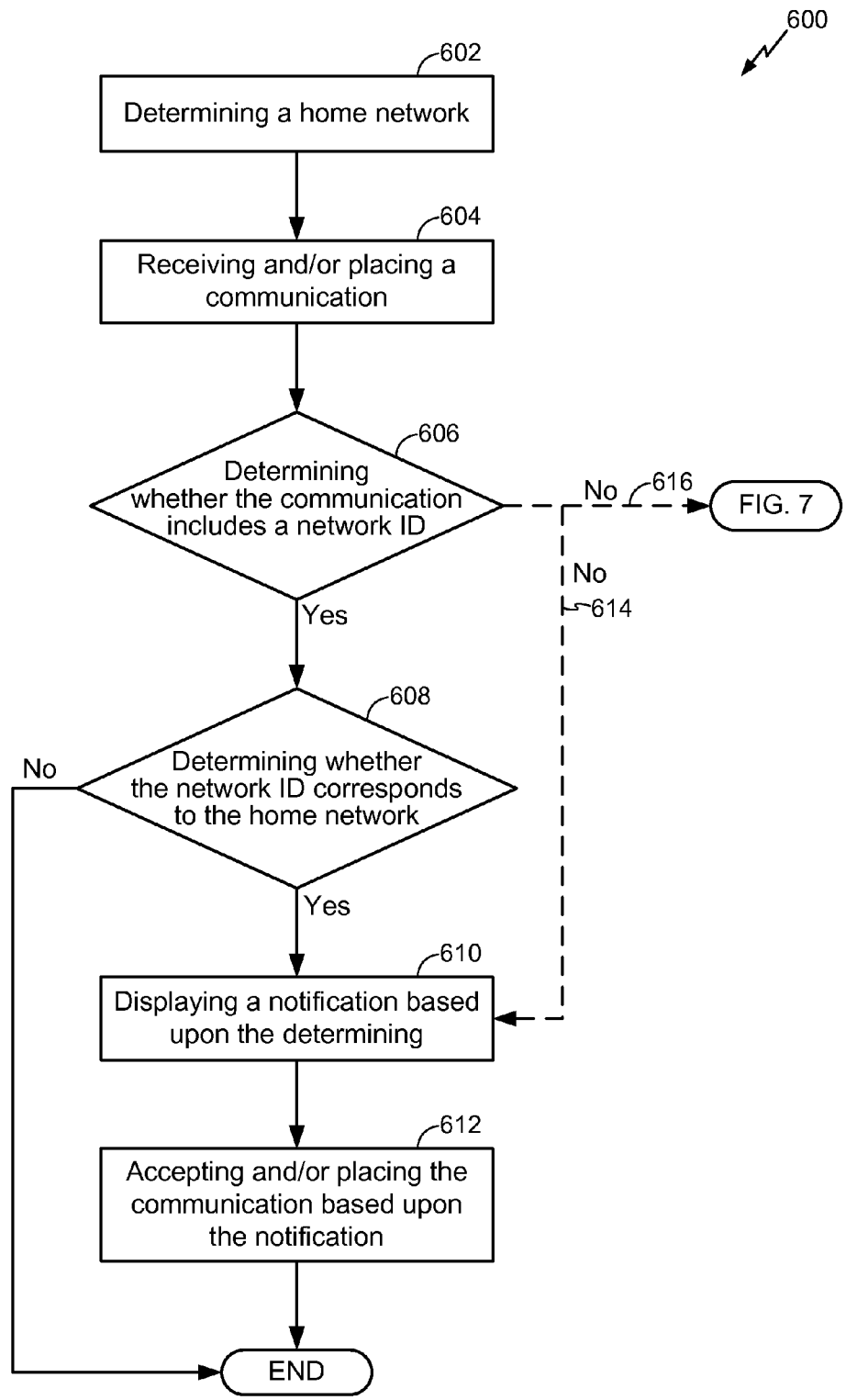
FIG. 6 is a flow chart illustrating a method for placing and/or receiving a communication at a mobile device in accordance with yet another aspect.

Referring now to the flow diagram 600 in FIG. 6, an aspect of a method for placing and/or receiving a communication includes, at 602, determining a home network for a wireless device. The home network may include, for example, a communication network where the wireless device is registered and/or a communication network where the wireless device receives preferred rates for communication performed within the network. Next, at 604, the method includes receiving and/or placing a communication with another communication device, as discussed above in relation to FIG. 1. It should be appreciated that a communication may include, for example, a telephone call, a SMS message, sending a video, forwarding a voice message, or any combination thereof, among others. At 606, the method includes determining whether the communication includes a network identifier (ID) identifying the network that the communication device is communicating over. The network ID may be provided to the wireless device by the network of the communication device, or by the home network of the wireless device, for example. In addition, the network ID may be sent as part of the communication or the network ID may be sent in a separate communication.

If the method determines that the communication includes a network ID then, at 608, the method includes determining whether the network ID corresponds to the home network for the wireless device, e.g., if the network the communication device is communication over is the same as the home network for the wireless device. Next, at 610, the method includes displaying a notification on the wireless device based upon the determination at 608. For example, the notification may be displayed on the wireless device. The notification may indicate whether the network ID is from the same communication network as the home network for the wireless device, from a different communication network, or that the communication network is unknown. Moreover, the notification may be a visual effect displayed on the wireless device and/or an audio effect emitted from the wireless device. A visual effect may include, but is not limited to, one or more of the following: displaying a number identifying the calling party in a color indicating the communication network, e.g., green from the same network, red for a different network, or grey for an unknown network; displaying an icon indicating the communication network, e.g., a check mark for the same network, a "X" for a different communication network, or a question mark for an unknown communication network; displaying different fonts to indicate whether the communication network is the same, different or unknown; or any combination thereof. In addition, an audio effect may include, for example, emitting different ring tones for identifying the communication network, e.g., different ring tones for the same network, a different network or unknown networks, and/or emitting a voice recording notifying the user of the communication network for the communication, among others.

At 612, the method includes accepting and/or placing the communication based upon the notification. For example, if the notification indicates that the communication network is the same as the home network for the wireless device, then the user may accept the call based upon the notification. Alternatively, if the notification indicates that the communication is from a different network or an unknown network, then the user may reject the call. It should be appreciated that the method may include prompting the user to either accept and/or reject the call. In an optional aspect, the communication may be automatically accepted and/or rejected based upon the notification, e.g., automatically accepting the call if the communication is from the same communication network or automatically rejecting the call if the communication is from a different communication network.

Optionally, at 614, if the method determines that the communication does not include a network ID then, the method may proceed to 610, where the method includes displaying a notification based upon the determining. Alternatively, at 616, if the method determines that the communication does not include a network ID then, the method may proceed to FIG. 7, where the method includes determining whether the call is associated with a contact stored on the wireless device.

Figure 7:
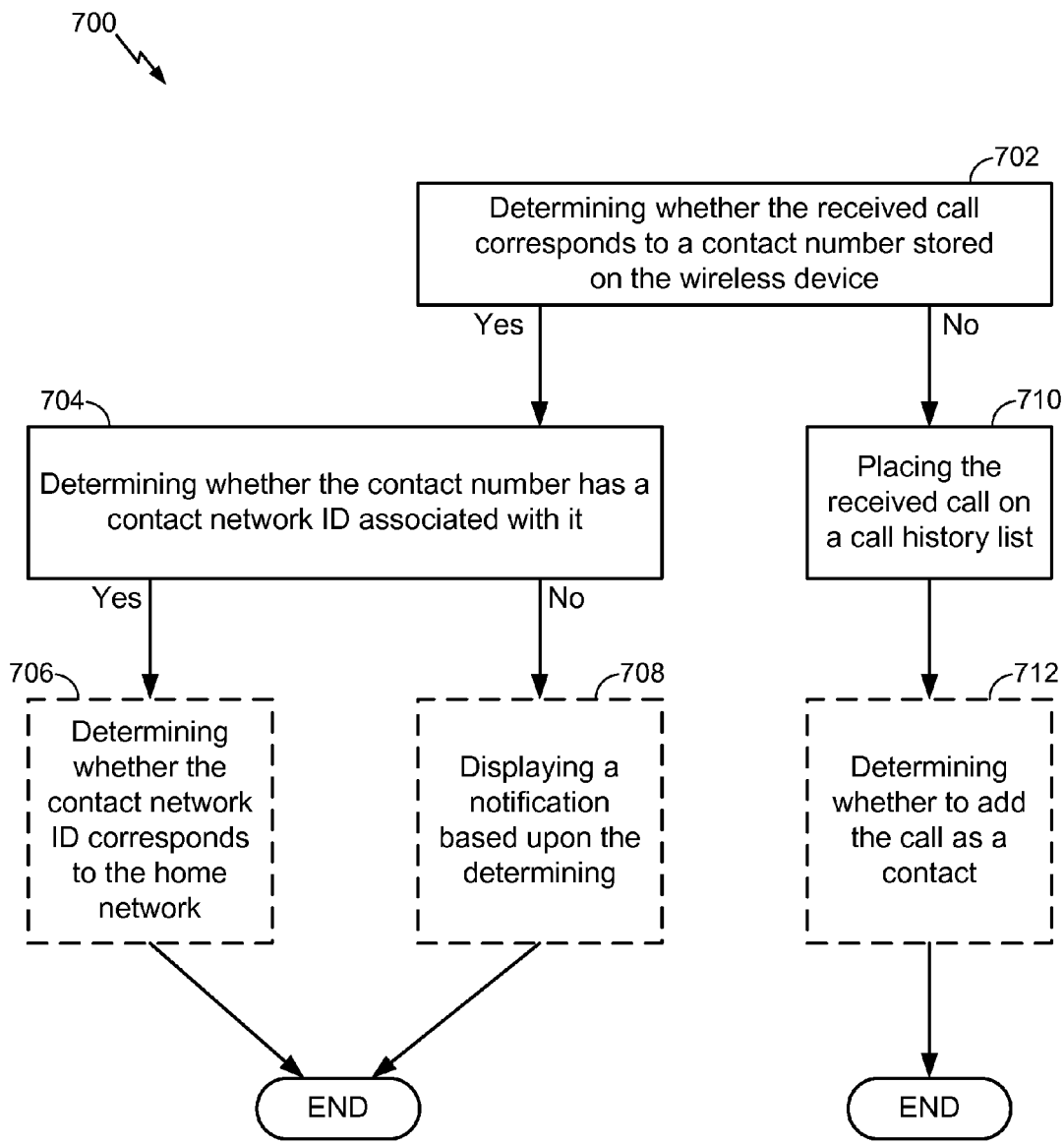
FIG. 7 is a flow chart illustrating a method for determining whether the received and/or placed communication is associated with a contact stored on the wireless device with an aspect.

Turning now to the flow diagram 700 in FIG. 7, an aspect of a method for determining whether the received and/or placed communication is associated with a contact stored on the wireless device includes, at 702, determining whether a number identifying the received call is associated with a contact number on the wireless device, e.g., if the two numbers match. As discussed above, the wireless device may have a PIM data store 20 (FIG. 3) for storing contact names 30, contact numbers 32 and/or contact number network IDs 34 (FIG. 3). Thus, the method may include comparing the number identifying the received call with a list of contact numbers stored on the wireless device for determining if there is a match with the number identifying the received call.

If the method determines that the received call is associated with a contact number then, at 704, the method includes determining whether the contact number is associated with a contact network ID, e.g., determining whether the contact number had previously been associated with the a contact network ID. Methods for adding and/or updating the network ID associated with a contact number are discussed in more detail below with respect to FIG. 8. At 706, if the method determines that the contact number is associated with a contact network ID then, the method may optionally follow to FIG. 6 where the method includes determining whether the contact network ID corresponds to the home network at 608 (FIG. 6); displaying a notification based on the determining at 610 (FIG. 6); and accepting and/or placing the call based upon the notification at 612 (FIG. 6).

Alternatively, at 708, if the method determines that the contact number is not associated with a contact network ID then, the method may optionally follow to FIG. 6 where the method includes displaying a notification based on the determining at 610 (FIG. 6); and accepting and/or placing the call based upon the notification at 612 (FIG. 6).

If, at 710, the method determines that the received call is not associated with a contact number then, the method includes placing the received call on a call history list, along with any additional call information, e.g., a phone number identifying the calling party, a network ID, the date the call was placed, the time the call was placed, and/or the length of the call. Optionally, at 712, the method includes determining whether to add the received call as a contact, as discussed below in 812 of FIG. 8.

Figure 8:
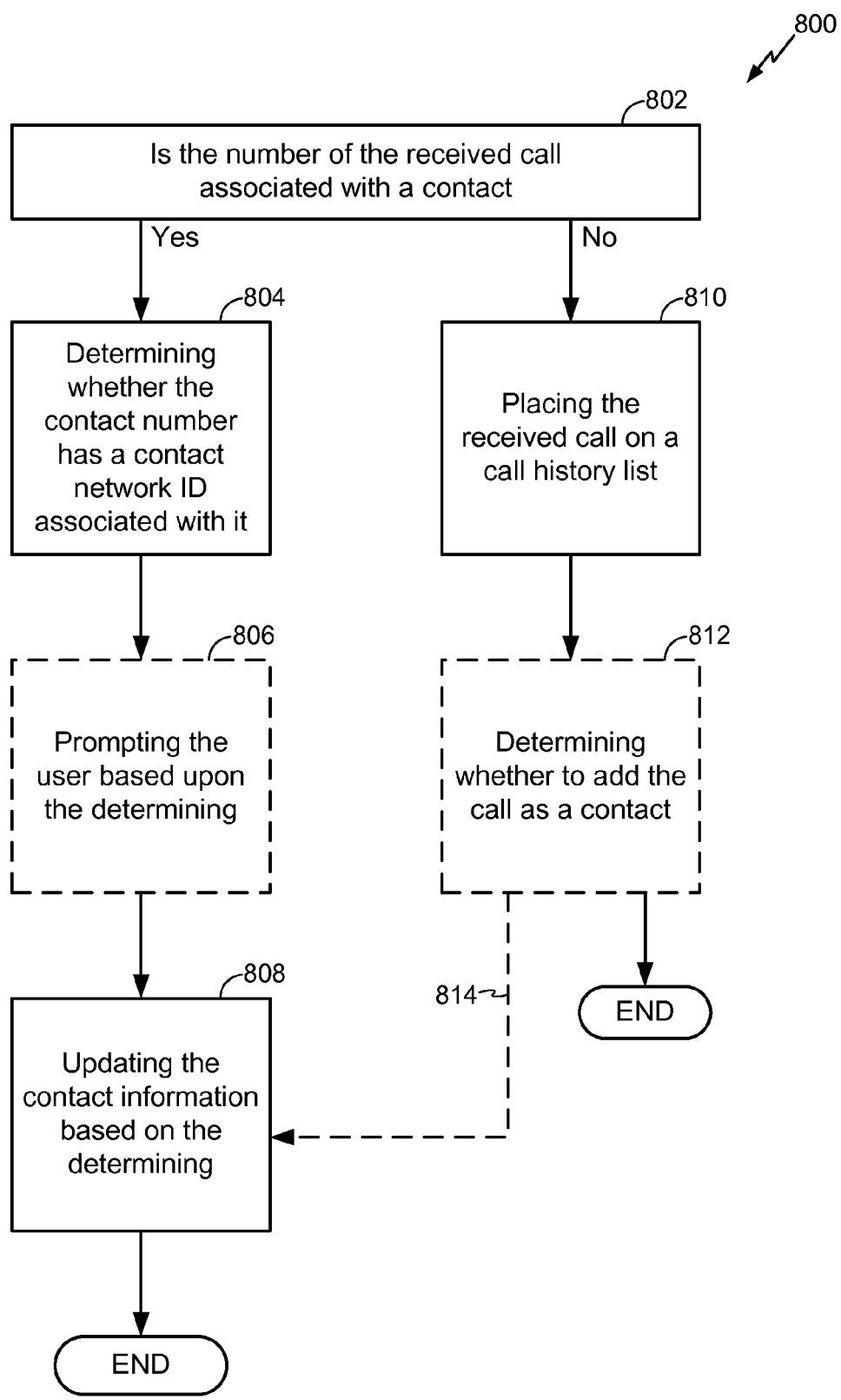
FIG. 8 is a flow chart illustrating a method for updating and/or adding contact information in accordance with still another aspect.

Referring now to the flow diagram 800 in FIG. 8, an aspect of a method for updating and/or adding contact information includes, at 802, determining whether a number identifying the received call corresponds to a contact number stored on the wireless device, e.g., a match between the number identifying the received call and a contact number. Next, at 804, if the method determines that the received call does correspond to a contact number, the method includes determining whether the received network ID (606 FIG. 6) is the same as the contact number network ID associated with the contact number. For example, the contact number may no longer be associated with the contact number network ID associated with the contact number, e.g., the network has switched and/or changed; the contact number is not associated with a contact network ID; or the contact number may still be associated with the number network ID.

Next, at 806, the method optionally includes prompting the user based upon the determining at 804. For example, the wireless device may display a message prompting the user to update the contact information. The message may include, for example, a notification that the contact network ID associated with the contact number has changed, does not match the information stored with the contact number, and/or the information is missing from the contact number. Thus, the user may be prompted when changes and/or updates are necessary for the contact information. In addition, the wireless device may display a message prompting the user to enter in and/or change a contact network ID name, e.g., an alias for the network. Therefore, the user may customize the name given to a particular network, e.g., home network, same network, my network, or different network.

At 808, the method includes updating the contact information, e.g., the contact name, contact number, contact network ID, contact network ID name, contact group ID, or contact address, based on the determining and/or the prompting. In one aspect, a user may update the contact network ID associated with a contact number. In another aspect, a user may add the contact to a group, e.g., friends, family, co-workers, and thus, may update the contact group ID. It should be appreciated that a group may be created based upon the network information associated with the contact, e.g., only contacts with the same network as the wireless device's home network may be added to the group.

Optionally, in one aspect, the method may update the contact information automatically based upon the information received with the received call, e.g., via signaling, a SMS message or USSD, without prompting the user. For example, if the contact network ID does not match the received network ID, then the method may automatically update the contact network ID associated with the contact number. Moreover, if the contact does not have a contact network ID associated with it, then the method may automatically add the network ID to the contact network ID. The contact number network ID name may also be automatically updated, e.g., home network, different network, based upon the information received with the call.

If, however, at 810, the method determines that the received call does not correspond to a contact number, the method includes placing the received call on a call history list. As discussed above, the call history list may include additional call information, such as a phone number identifying the calling party, a network ID, the date the call was placed, the time the call was placed, and/or the length of the call. At 812, the method may optionally include determining whether to add the received call as a contact. If the method determines to add the call as a contact, the method may follow 814 to 808, where the method includes updating the contact information based upon the determining.

Figure 9:
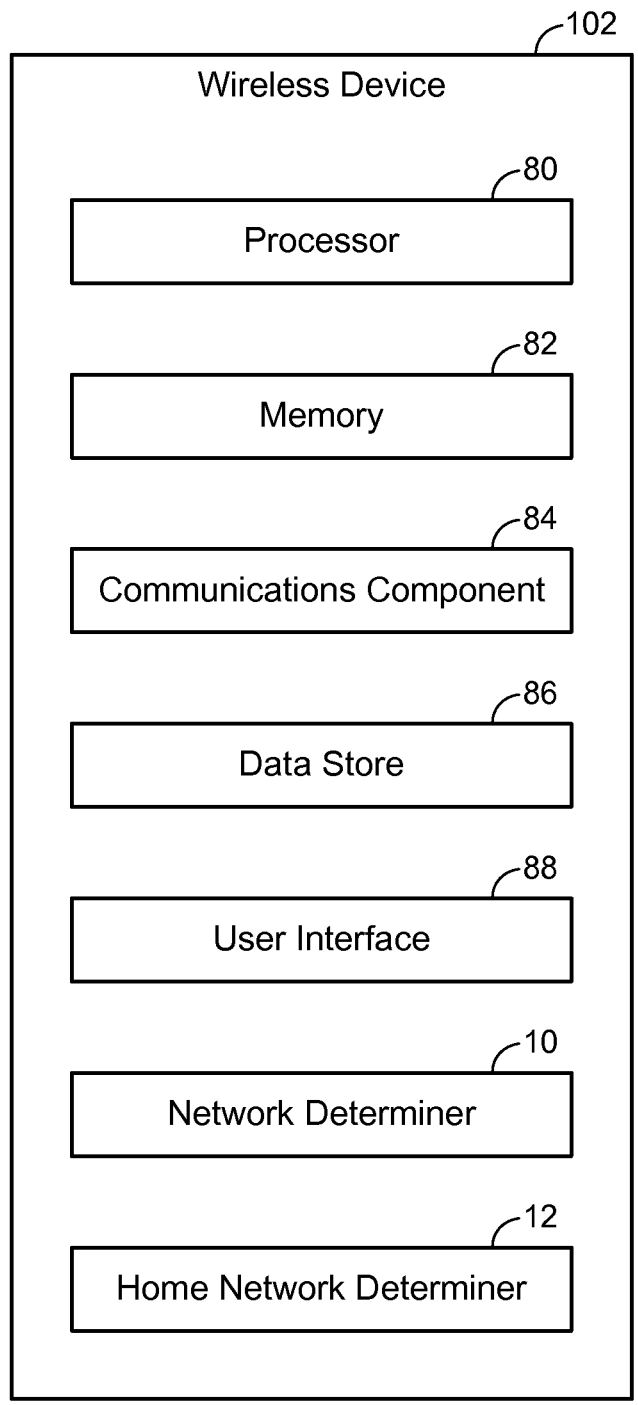
FIG. 9 is an illustration of an example wireless device operable within the connectivity system in accordance with an aspect.

Referring to FIG. 9, in one aspect, wireless device 102 may include a processor 80 for carrying out processing functions associated with one or more of components and functions described herein. Processor 80 can include a single or multiple set of processors or multi-core processors. Moreover, processor 80 can be implemented as an integrated processing system and/or a distributed processing system.

Wireless device 102 may further includes a memory 82, such as for storing local versions of applications being executed by processor 80. Memory 82 can include any type of memory usable by a computer, such as random access memory (RAM), read only memory (ROM), tapes, magnetic discs, optical discs, volatile memory, non-volatile memory, and any combination thereof.

Further, wireless device 102 includes a communications component 84 that provides for establishing and maintaining communications with one or more parties utilizing hardware, software, and services as described herein. Communications component 84 may carry communications between components on wireless device 102, as well as between wireless device 102 and external devices, such as devices located across a communications network and/or devices serially or locally connected to wireless device 102. For example, communications component 84 may include one or more buses, and may further include transmit chain components and receive chain components associated with a transmitter and receiver, respectively, operable for interfacing with external devices.

Additionally, wireless device 102 may further include a data store 86, which can be any suitable combination of hardware and/or software, that provides for mass storage of information, databases, and programs employed in connection with aspects described herein. For example, data store 86 may be a data repository for applications not currently being executed by processor 80.

Wireless device 102 may additionally include a user interface component 88 operable to receive inputs from a user of wireless device 102, and further operable to generate outputs for presentation to the user. User interface component 88 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 88 may include one or more output devices, including but not limited to a display, a speaker, a haptic feedback mechanism, a printer, any other mechanism capable of presenting an output to a user, or any combination thereof.

Wireless device 102 may also include a network determiner component 10 (FIG. 1) operable for determining one or more communication networks between wireless device 102 and external devices, such as devices located across a communications network and/or devices serially or locally connected to wireless device 102. Moreover, wireless device 102 may further include a home network determiner component 12 operable for determining the home communication network for wireless device 102.

Figure 10:
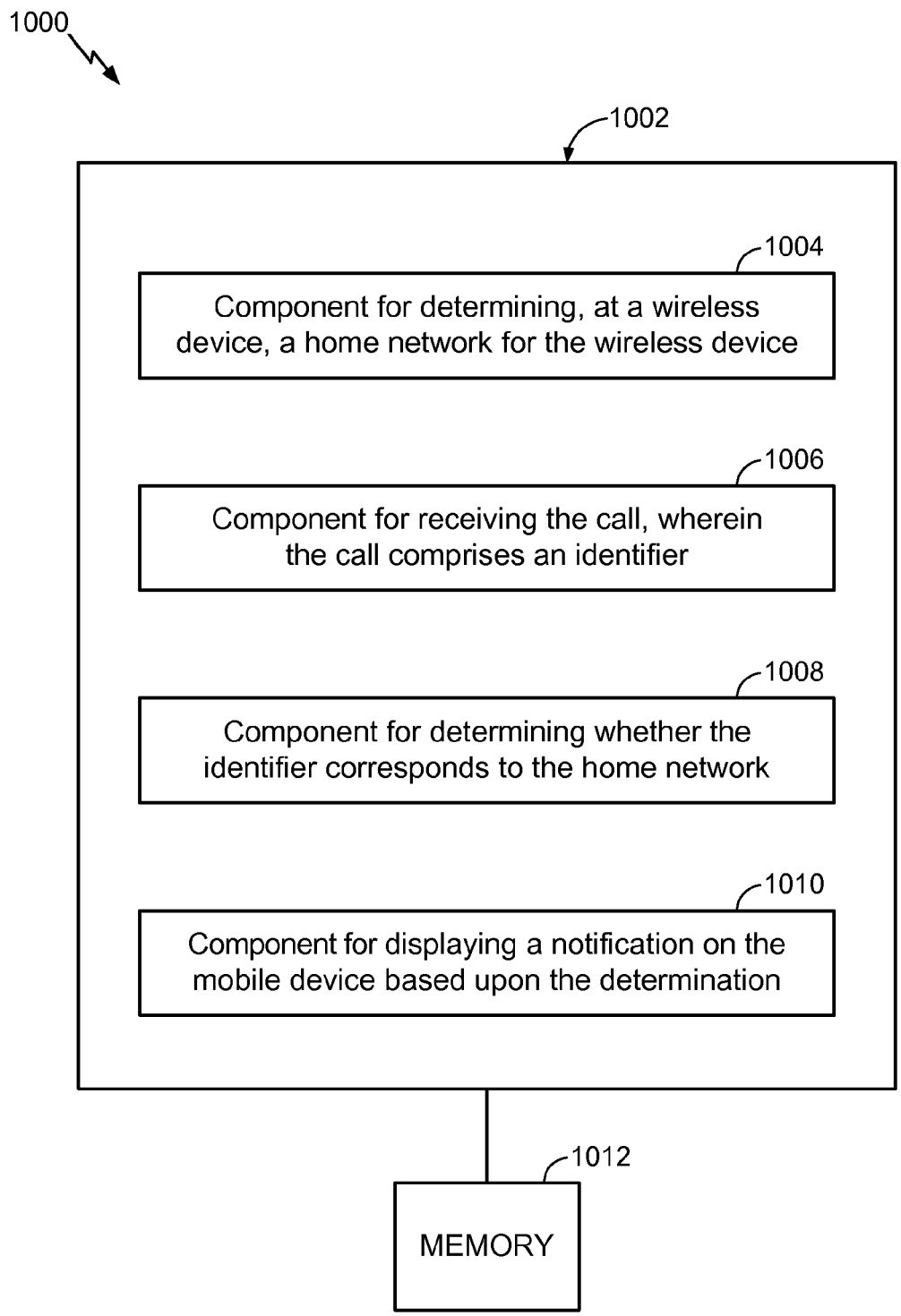
FIG. 10 is an illustration of an example system that facilitates managing content in accordance with yet another aspect.

Referring now to FIG. 10, illustrated is a system 1000 configured to manage content. For example, system 1000 can reside at least partially within a transmitter, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that facilitate receiving a call. For instance, logical grouping 1002 may include component 1004 for determining, at a wireless device, a home network for the wireless device. Further, logical grouping 1002 may comprise component 1006 for receiving the call, wherein the call comprises an identifier. In addition, logical grouping 1002 may include component 1008 for determining whether the identifier corresponds to the home network. Logical grouping 1002 may also include component 1010 for displaying a notification on the mobile device based upon the determination. Additionally, system 1000 can include a memory 1012 that retains instructions for executing functions associated with electrical components 1004, 1006, 1008 and 1010. While shown as being external to memory 1012, it is to be understood that one or more of electrical components 1004, 1006, 1008 and 1010 can exist within memory 1012.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for receiving a call, the method comprising:
   determining, at a wireless device, a home network for the wireless device;
   receiving the call at the wireless device, wherein the call comprises an identifier;
   determining, at the wireless device, whether the identifier corresponds to the home network for the wireless device;
   automatically accepting the call at the wireless device if the identifier corresponds to the home network or automatically rejecting the call at the wireless device if the identifier does not correspond to the home network; and
   generating a notification on the wireless device based upon the determination of whether the identifier corresponds to the home network.

2. The method of claim 1, wherein the identifier comprises a network identification.

3. The method of claim 2, wherein the network identification identifies a network for a calling party.

4. The method of claim 2, wherein the network identification identifies a network for a called party.

5. The method of claim 2, further comprising:
   storing a network name associated with the network identification, wherein the network name is entered by a user of the wireless device.

6. The method of claim 5, wherein generating the notification comprises displaying the network name associated with the network identification.

7. The method of claim 1, wherein the identifier comprises a number identifying a party associated with the call.

8. The method of claim 7, wherein the party comprises a calling party.

9. The method of claim 7, wherein the party comprises a called party.

10. The method of claim 1, wherein the call comprises one or more of a voice call, a video conferencing call, a short message service (SMS) message, a multimedia messaging service (MMS) message, a video, a forwarded voice message, a data transfer, or a voice over internet protocol (IP) call.

11. The method of claim 1, wherein generating the notification comprises one or more of displaying a network name for a network identification associated with the received call, displaying a visual effect, emitting an audio effect, or any combination thereof.

12. The method of claim 11, wherein the visual effect comprises one or more of displaying a number identifying a party associated with the call in a color, displaying an icon, displaying a picture, displaying the number in a font, or any combination thereof.

13. The method of claim 11, wherein the notification is customized by a user of the wireless device.

14. The method of claim 1, further comprising:
   storing, at the wireless device, one or more numbers identifying one or more calling parties and one or more network identifications identifying one or more networks for the one or more calling parties, wherein the storing associates the one or more network identifications with the one or more numbers identifying the one or more calling parties.

15. A method for receiving a call, comprising:
   determining, at a wireless device, a home network for the wireless device;
   storing, at the wireless device, one or more numbers identifying one or more calling parties and one or more network identifications identifying one or more networks for the one or more calling parties, wherein the storing associates the one or more network identifications with the one or more numbers identifying the one or more calling parties;
receiving the call, wherein the call comprises an identifier;
determining whether the identifier corresponds to the home network;
generating a notification on the wireless device based upon the determination;
comparing a number identifying a calling party associated with the call with the one or more previously stored numbers identifying the one or more calling parties;
determining, if the number identifying the calling party matches one of the previously stored numbers, whether the previously stored network identification associated with the matching one of the previously stored numbers matches a network identification associated with the received call; and
updating the previously stored network identification associated with the matching one of the previously stored numbers in response to determining that the previously stored network identification does not match the network identification associated with the received call, wherein the updating comprises changing the previously stored network identification to the network identification associated with the received call.

16. The method of claim 15, wherein the updating occurs automatically in response to determining that the previously stored network identification does not match the network identification associated with the received call or based on one or more inputs received in response to a message notifying a user that the previously stored network identification does not match the network identification associated with the received call.

17. The method of claim 15, further comprising:
grouping the one or more previously stored numbers identifying the calling parties based upon the network identifications associated with the one or more previously stored numbers.

18. A method for receiving a call, comprising:
determining, at a wireless device, a home network for the wireless device;
receiving the call at the wireless device, wherein the call comprises an identifier and the identifier comprises a number identifying a calling party associated with the call;
comparing, at the wireless device, the number identifying the calling party with one or more previously stored numbers identifying calling parties;
determining, if the number identifying the calling party matches one of the previously stored numbers, whether the matching one of the previously stored numbers is associated with a network identification that corresponds to the home network for the wireless device;
generating a notification on the wireless device based upon the determination; and
automatically accepting the call at the wireless device if the network identification associated with the matching one of the previously stored numbers corresponds to the home network for the wireless device.

19. The method of claim 18, further comprising:
prompting a user to update the matching one of the previously stored numbers with a network identification associated with the received call; and
updating the matching one of the previously stored numbers.

20. The method of claim 18, further comprising placing the call on a received call history list if the number identifying the calling party does not match one of the previously stored numbers.

21. A processor configured to receive a call, the processor comprising:
a first module for determining, at a wireless device, a home network for the wireless device;
a second module for receiving the call at the wireless device, wherein the call comprises an identifier;
a third module for determining, at the wireless device, whether the identifier corresponds to the home network;
a fourth module for automatically accepting the call at the wireless device if the identifier corresponds to the home network or automatically rejecting the call at the wireless device if the identifier does not correspond to the home network; and
a fifth module for generating a notification on the wireless device based upon the determination of whether the identifier corresponds to the home network.

22. The processor of claim 21, wherein the identifier comprises a network identification.

23. The processor of claim 22, wherein the network identification identifies a network for a calling party.

24. The processor of claim 22, wherein the network identification identifies a network for a called party.

25. The processor of claim 21, wherein the identifier comprises a number identifying a party associated with the call.

26. The processor of claim 25, wherein the party comprises a calling party.

27. The processor of claim 25, wherein the party comprises a called party.

28. The processor of claim 21, wherein the call comprises one or more of a voice call, a video conferencing call, a short message service (SMS) message, a multimedia messaging service (MMS) message, a video a forwarded voice message, a data transfer, or a voice over internet protocol (IP) call.

29. A processor configured to receive a call, the processor comprising:
a first module for determining, at a wireless device, a home network for the wireless device;
a second module for receiving the call at the wireless device, wherein the call comprises an identifier and the identifier comprises a number identifying a calling party associated with the call;
a third module for comparing, at the wireless device, the number identifying the calling party with one or more previously stored numbers identifying calling parties;
a fourth module for determining, if the number identifying the calling party matches one of the previously stored numbers, whether the matching one of the previously stored numbers is associated with a network identification that corresponds to the home network for the wireless device;
a fifth module for generating a notification on the wireless device based upon the determination; and
a sixth module for automatically accepting the call at the wireless device if the network identification associated with the matching one of the previously stored numbers corresponds to the home network for the wireless device.

30. A computer program product, comprising:
a non-transitory computer-readable medium having program codes encoded thereon, which when executed by one or more processors in a wireless device cause the wireless device to:
determine a home network for the wireless device;
receive a call, wherein the call comprises an identifier;

determine whether the identifier corresponds to the home network;

automatically accept the call if the identifier corresponds to the home network or automatically reject the call if the identifier does not correspond to the home network; and generate a notification on the wireless device based upon the determination of whether the identifier corresponds to the home network.

31. The computer program product of claim 30, wherein the identifier comprises a network identification.

32. The computer program product of claim 31, wherein the network identification identifies a network for a calling party.

33. The computer program product of claim 31, wherein the network identification identifies a network for a called party.

34. The computer program product of claim 30, wherein the identifier comprises a number identifying a party associated with the call.

35. The computer program product of claim 34, wherein the party comprises a calling party.

36. The computer program product of claim 34, wherein the party comprises a called party.

37. The computer program product of claim 30, wherein the call comprises one or more of a voice call, a video conferencing call, a short message service (SMS) message, a multimedia messaging service (MMS) message, a video, a forwarded voice message, a data transfer, or a voice over internet protocol (IP) call.

38. A non-transitory computer-readable medium having program codes encoded thereon, which when executed by one or more processors in a wireless device cause the wireless device to:

determine a home network for the wireless device;

receive a call, wherein the call comprises an identifier and the identifier comprises a number identifying a calling party associated with the call;

compare the number identifying the calling party with one or more previously stored numbers identifying calling parties;

determine, if the number identifying the calling party matches one of the previously stored numbers, whether the matching one of the previously stored numbers is associated with a network identification that corresponds to the home network for the wireless device;

generate a notification on the wireless device based upon the determination; and automatically accept the call if the network identification associated with the matching one of the previously stored numbers corresponds to the home network for the wireless device.

39. An apparatus, comprising:

means for determining, at a wireless device, a home network for the wireless device;

means for receiving a call at the wireless device, wherein the call comprises an identifier;

means for determining, at the wireless device, whether the identifier corresponds to the home network;

means for automatically accepting the call at the wireless device if the identifier corresponds to the home network or automatically rejecting the call at the wireless device if the identifier does not correspond to the home network; and means for generating a notification on the wireless device based upon the determination of whether the identifier corresponds to the home network.

40. The apparatus of claim 39, wherein the identifier comprises a network identification.

41. The apparatus of claim 40, wherein the network identification identifies a network for a calling party.

42. The apparatus of claim 40, wherein the network identification identifies a network for a called party.

43. The apparatus of claim 39, wherein the identifier comprises a number identifying a party associated with the call.

44. The apparatus of claim 43, wherein the party comprises a calling party.

45. The apparatus of claim 43, wherein the party comprises a called party.

46. The apparatus of claim 39, wherein the call comprises one or more of a voice call, a video conferencing call, a short message service (SMS) message, a multimedia messaging service (MMS) message, a video, a forwarded voice message, a data transfer, or a voice over internet protocol (IP) call.

47. An apparatus, comprising:

means for determining, at a wireless device, a home network for the wireless device;

means for receiving a call at the wireless device, wherein the call comprises an identifier and the identifier comprises a number identifying a calling party associated with the call;

means for comparing, at the wireless device, the number identifying the calling party with one or more previously stored numbers identifying calling parties;

means for determining, if the number identifying the calling party matches one of the previously stored numbers, whether the matching one of the previously stored numbers is associated with a network identification that corresponds to the home network for the wireless device;

means for generating a notification on the wireless device based upon the determination; and means for automatically accepting the call at the wireless device if the network identification associated with the matching one of the previously stored numbers corresponds to the home network for the wireless device.

48. An apparatus, comprising:

a home network determiner component configured for determining, at a wireless device, a home network for the wireless device;

a communications component configured for receiving a call at the wireless device, wherein the call comprises an identifier;

a network determiner component configured for determining, at the wireless device, whether the identifier corresponds to the home network;

a processor configured for automatically accepting the call at the wireless device if the identifier corresponds to the home network or automatically rejecting the call at the wireless device if the identifier does not correspond to the home network; and a presentor component configured for generating a notification on the wireless device based upon the determination of whether the identifier corresponds to the home network.

49. The apparatus of claim 48, wherein the identifier comprises a network identification.

50. The apparatus of claim 49, wherein the network identification identifies a network for a calling party.

51. The apparatus of claim 49, wherein the network identification identifies a network for a called party.

52. The apparatus of claim 49, further comprising:
a personal information management data store configured for storing a network name associated with the network identification, wherein the network name is entered by a user of the wireless device.

53. The apparatus of claim 52, wherein the presentor component is further configured for generating the notification by displaying the network name associated with the network identification.

54. The apparatus of claim 48, wherein the identifier comprises a number identifying a party associated with the call.

55. The apparatus of claim 54, wherein the party comprises a calling party.

56. The apparatus of claim 54, wherein the party comprises a called party.

57. The apparatus of claim 48, wherein the call comprises one or more of a voice call, a video conferencing call, a short message service (SMS) message, a multimedia messaging service (MMS) message, a video, a forwarded voice message, a data transfer, or a voice over internet protocol (IP) call.

58. The apparatus of claim 48, wherein the presentor component is further configured for generating the notification by one or more of displaying a network name for a network identification associated with the received call, displaying a visual effect, emitting an audio effect, or any combination thereof.

59. The apparatus of claim 58, wherein the visual effect comprises one or more of displaying a number identifying a party associated with the call in a color, displaying an icon, displaying a picture, displaying the number identifying the party in a font, or any combination thereof.

60. The apparatus of claim 58, wherein the notification is customized by a user of the wireless device.

61. The apparatus of claim 48, further comprising:
a personal information management data store configured for storing, at the wireless device, one or more numbers identifying one or more calling parties and one or more network identifications identifying one or more networks for the one or more calling parties, wherein the storing associates the one or more network identifications with the one or more numbers identifying the one or more calling parties.

62. The apparatus of claim 61, further comprising:
a grouping component configured for grouping the one or more previously stored numbers identifying the calling parties based upon the network identifications associated with the one or more previously stored numbers.

63. An apparatus, comprising:
a home network determiner component configured for determining, at a wireless device, a home network for the wireless device;
a personal information management data store configured for storing, at the wireless device, one or more numbers identifying one or more calling parties and one or more network identifications identifying one or more networks for the one or more calling parties, wherein the storing associates the one or more network identifications with the one or more numbers identifying the one or more calling parties;
a communications component configured for receiving a call, wherein the call comprises an identifier;
a network determiner component configured for determining whether the identifier corresponds to the home network;
a presentor component configured for generating a notification on the wireless device based upon the determination of the network determiner component;
a correlator component configured for comparing a number identifying a calling party associated with the call with the one or more previously stored numbers identifying calling parties, wherein the correlator component is further configured for determining, if the number identifying the calling party matches one of the previously stored numbers, whether the previously stored network identification associated with the matching one of the previously stored numbers matches a network identification associated with the received call; and
an updator component configured for updating the previously stored network identification associated with the matching one of the previously stored numbers if the previously stored network identification does not match the network identification associated with the received call, wherein the updating comprises changing the previously stored network identification to the network identification associated with the received call.

64. The apparatus of claim 63, wherein the updating occurs automatically in response to the correlator component determining that the previously stored network identification does not match the network identification associated with the received call or based on one or more inputs received at a user interface component in response to a message notifying a user that the previously stored network identification does not match the network identification associated with the received call.

65. An apparatus, comprising:
a home network determiner component configured for determining, at a wireless device, a home network for the wireless device;
a communications component configured for receiving the call at the wireless device, wherein the call comprises an identifier and the identifier comprises a number identifying a calling party associated with the call;
a correlator component configured for comparing, at the wireless device, the number identifying the calling party with one or more previously stored numbers identifying calling parties;
a network determiner component configured for determining, if the number identifying the calling party matches one of the previously stored numbers, whether the matching one of the previously stored numbers is associated with a network identification that corresponds to the home network for the wireless device;
a presentor component configured for generating a notification on the wireless device based upon the determination; and
a processor further configured for automatically accepting the call at the wireless device if the network identification associated with the matching one of the previously stored numbers corresponds to the home network for the wireless device.

66. The apparatus of claim 65, further comprising:
a user interface component configured for prompting a user to update the matching one of the previously stored numbers with a network identification associated with the received call; and
an updator component configured for updating the matching one of the previously stored numbers.

67. The apparatus of claim 65, wherein the updator component is further configured for placing the call on a received call history list if the number identifying the calling party does not match one of the previously stored numbers.

68. A processor configured to receive a call, the processor comprising:

a first module for determining, at a wireless device, a home network for the wireless device;
a second module for storing, at the wireless device, one or more numbers identifying one or more calling parties and one or more network identifications identifying one or more networks for the one or more calling parties, wherein the storing associates the one or more network identifications with the one or more numbers identifying the one or more calling parties;
a third module for receiving a call, wherein the call comprises an identifier;
a fourth module for determining whether the identifier corresponds to the home network;
a fifth module for generating a notification on the wireless device based upon the determination of the fourth module;
a sixth module for comparing a number identifying a calling party associated with the call with the one or more previously stored numbers identifying the one or more calling parties;
a seventh module for determining, if the number identifying the calling party associated with the call matches one of the previously stored numbers, whether the previously stored network identification associated with the matching one of the previously stored numbers matches a network identification associated with the received call; and
an eighth module for updating the previously stored network identification associated with the matching one of the previously stored numbers if the previously stored network identification does not match the network identification associated with the received call, wherein the updating comprises changing the previously stored network identification to the network identification associated with the received call.

69. A computer program produce, comprising:
a non-transitory computer-readable medium having program codes encoded thereon, which when executed by one or more processors in a wireless device cause the wireless device to:
determine, at a wireless device, a home network for the wireless device;
store, at the wireless device, one or more number identifying one or more calling parties and one or more network identifications identifying one or more networks for the one or more calling parties, wherein the storing associates the one or more network identifications with the one or more numbers identifying the one or more calling parties;
receive a call, wherein the call comprises an identifier;
determine whether the identifier corresponds to the home network;
generate a notification on the wireless device based upon the determination of whether the identifier corresponds to the home network;
compare a number identifying a calling party associated with the call with the one or more previously stored numbers identifying the one or more calling parties;
determine, if the number identifying the calling party associated with the call matches one of the previously stored numbers, whether the previously stored network identification associated with the matching one of the previously stored numbers matches a number identification associated with the received call; and
update the previously stored network identification associated with the matching one of the previously stored numbers if the previously stored network identification does not match the network identification associated with the received call, wherein the updating comprises changing the previously stored network identification to the network identification associated with the received call.

70. An apparatus, comprising:
means for determining, at a wireless device, a home network for the wireless device;
means for storing, at the wireless device, one or more numbers identifying one or more calling parties and one or more network identifications identifying one or more networks for the one or more calling parties, wherein the storing associates the one or more network identifications with the one or more numbers identifying the one or more calling parties;
means for receiving a call, wherein the call comprises an identifier;
means for determining whether the identifier corresponds to the home network;
means for generating a notification on the wireless device based upon the determination of whether the identifier corresponds to the home network;
means for comparing a number identifying a calling party associated with the call with the one or more previously stored numbers identifying the one or more calling parties;
means for determining, if the number identifying the calling party associated with the call matches one of the previously stored numbers, whether the previously stored network identification associated with the matching one of the previously stored numbers matches a network identification associated with the received call; and
means for updating the previously stored network identification associated with the matching one of the previously stored numbers if the previously stored network identification does not match the network identification associated with the received call, wherein the updating comprises changing the previously stored network identification to the network identification associated with the received call.

\* \* \* \* \*